UNITED STATES PATENT OFFICE 2,557,618

BRUSH AND SHRUB KILLER

Emerson B. Stull, Sebree, Ky., assignor, by mesne assignments, to Stull's Chemicals, Inc., a corporation of Texas No Drawing. Application August 3, 1948,
Serial No. 42,332

8 Claims. (Cl. 71—2.6)

This invention relates to a novel herbicidal composition for use in the destruction of such obnoxious woody plants as Osage orange, sassafras, willow, oak, elm, locust, mesquite, yucca, juniper, elder, plum, and the like.

The primary object of this invention is to provide a novel composition of an effective herbicide in a non-phytotoxic oil which, when applied to the foliage or bark of an obnoxious woody growth, will readily be translocated into the roots of the plant, causing ultimate complete destruction of the entire plant.

The applicant is aware of many teachings in the art which disclose the use of herbicides in various oils for the destruction of a wide variety of weeds and plants. However, the oils shown in the art fall generally in the class of crude petroleum products, motor oils, and Diesel fuel oils. All of these oils are herbicidal in themselves, and consequently when they are combined with another herbicide, a quick kill on the top growth or foliage of plants is always obtained, with the result that a very slight translocation of the herbicide to the roots of the plant is effected by such compositions. Consequently, these herbicidal oil compositions must be used frequently and repeatedly and, in many cases, simply fail to effect complete destruction of the woody growth. For example, when these oils are employed to destroy such plants as Osage orange, cedar, and juniper, no destruction or even effective control of these plants is obtained. To obtain any effective control of these plants in particular, it has become necessary to either cut deeply into the bark or else the entire foliage of the plants must be completely covered with the spray before any appreciable translocation or penetration of the herbicide can be effective.

The compositions of the instant invention obviate the necessity of cutting into the bark or of completely covering the foliage of the brush with the spray. The compositions of the instant invention have also been found to be completely effective against the above mentioned woody growths which have defied control by the herbicidal oil compositions presently on the market. They can be additionally employed for very effective control of weedy grasses such as Johnson grass, quack grass, and the like by spraying the aerial part, and the carrier being of such a penetrating quality takes the herbicide into the plant in sufficient quantities to induce a kill. The only way to achieve this result with conventional herbicides is to apply the herbicide directly to the roots of the plants.

The superior effects of translocation of a herbicide to the roots of woody growths is obtained by the use of a horticultural base oil having an unsulfonated residue of 94% by volume and a boiling range of 500 to 636° F. The high unsulfonated residue content of the oil is responsible for the non-phytotoxic properties of the oil, and the high boiling range of the oil prevents any substantial vaporization of the herbicide employed in the oil, thus eliminating the possibility of damage to adjacent desirable plants. This high boiling range of the oil is extremely essential, since many herbicidal formulations presently on the market cannot be employed in a hot climate, since the vapors from the sprayed portions drift onto other desirable plants, inflicting a great deal of damage thereto. The horticultural base oil herbicidal compositions of the instant invention can, therefore, be employed in very arid, hot sections such as in deserts or near deserts, and can effectively eliminate many species of woody growth in comparison with other conventional herbicidal formulations that have been known to evaporate so rapidly in this climate that the herbicide could not penetrate into the plant before the carrier had entirely evaporated, leaving a dry deposit on the plant and making the herbicidal formulations virtually valueless. The horticultural base oil employed in the compositions of the instant invention has shown visible effects for as much as seven days after application on the woody growth. Also, because of the low vaporization of the horticultural base oil and its high penetrability, slow acting herbicides employed together with this oil have been found to be extremely effective.

While it is to be understood that virtually any herbicide may be employed together with the horticultural base oil in making up the compositions of the instant invention, herbicides selected from the group consisting of 2,4-dichlorophenoxyacetic acid, 2,4,5-trichlorophenoxyacetic acid and esters thereof, preferably alkyl, have been found to be most effective. Of the esters of these two acids employed, the most effective appear to be the methyl, ethyl, propyl, isopropyl, and butyl esters. It has also been observed that mixtures of the two acids as well as mixtures of esters of the two acids have been more effective in the destruction of certain woody growths than the single acids or esters thereof. While the herbicides may be employed in the oil solution to the extent of 2 to 60 per cent by weight of the oil, it is to be understood that because of the low vaporization of the horticultural base oil and the high penetrability of this oil, lower percentages of the herbicide can be effectively employed.

The superior carrier oil employed together with the above mentioned herbicides is Horticultural base oil No. 7, Shell Oil Company, having the following properties:

| | |
|---|---|
| Gravity, °A. P. I | 41 |
| Color, Saybolt | Min. 0 |
| Viscosity, S. S. U. at 100° F | 38–45 |
| Flash, Cleveland O. C., °F | Min. 240 |
| Unsulfonated residue, per cent b. v | 94 |
| Boiling range, °F | 500–636 |
| Pounds per gal | 6.84–6.87 |

From the foregoing, it will be obvious to those skilled in the art that the process of compounding the herbicidal oil compositions of the instant invention consist merely of dissolving any desired amount of herbicide within the range stated hereinabove in the horticultural base oil. To get a more effective solution of the herbicide in the oil, especially when using the upper range percentages of the herbicide, agitation and heat may be applied if desired.

Any suitable means, preferably spraying, may be employed for applying the herbicidal compositions of the instant invention to the obnoxious woody growths.

It is apparent that variations may be made in the instant invention without departing from the spirit thereof.

Having described the invention, what is claimed as new is:

1. A brush and shrub killer consisting of a chlorinated phenoxyacetic acid herbicide in a non-phytotoxic horticultural base oil having a boiling range of 500–636° F. and an unsulfonated residue of 94 per cent by volume.

2. The composition of claim 1 wherein said herbicide includes a member selected from the group consisting of 2,4-dichlorophenoxyacetic acid, 2,4,5-trichlorophenoxyacetic acid and alkyl esters thereof.

3. A brush and shrub killer consisting of a non-phytotoxic horticultural base oil having a boiling range of 500–636° F. and an unsulfonated residue of 94 per cent by volume and 2 to 60 per cent by weight of oil of a herbicide selected from the group consisting of 2,4-dichlorophenoxyacetic acid, 2,4,5-trichlorophenoxyacetic acid and alkyl esters thereof.

4. A brush and shrub killer consisting of a non-phytotoxic horticultural base oil having a boiling range of 500–636° F. and an unsulfonated residue of 94 per cent by volume and 2 to 60 per cent by weight of oil of a herbicide comprising a mixture of 2,4-dichlorophenoxyacetic acid and 2,4,5-trichlorophenoxyacetic acid.

5. A brush and shrub killer consisting of a herbicide selected from the group consisting of 2,4-dichlorophenoxyacetic acid, 2,4,5-trichlorophenoxyacetic acid and alkyl esters thereof and a horticultural base oil having the following properties:

| | |
|---|---|
| Gravity, °A. P. I | 41 |
| Color, Saybolt | Min. 0 |
| Viscosity, S. S. U. at 100° F | 38–45 |
| Flash, Cleveland O. C., °F | Min. 240 |
| Unsulfonated residue, per cent b. v | 94 |
| Boiling range, °F | 500–636 |
| Pounds per gal | 6.84–6.87 |

6. The composition of claim 5 wherein said herbicide is present in 2 to 60% by weight of the oil.

7. The composition of claim 6 wherein said herbicide is 2,4-dichlorophenoxyacetic acid.

8. A brush and shrub killer consisting of a horticultural base oil having the following properties:

| | |
|---|---|
| Gravity, °A. P. I | 41 |
| Color, Saybolt | Min. 0 |
| Viscosity, S. S. U. at 100° F | 38–45 |
| Flash, Cleveland O. C., °F | Min. 240 |
| Unsulfonated residue, per cent b. v | 94 |
| Boiling range, °F | 500–636 |
| Pounds per gal | 6.84–6.87 | and 2 to 60% by weight of the oil of alkyl esters of 2,4-dichlorophenoxyacetic acid.

EMERSON B. STULL.

REFERENCES CITED

The following references are of record in the file of this patent:

UNITED STATES PATENTS

| Number | Name | Date |
|---|---|---|
| 1,949,798 | Knight | Mar. 6, 1934 |
| 2,209,905 | Ralston | July 30, 1940 |
| 2,322,761 | Lontz | June 29, 1943 |
| 2,326,471 | Lontz | Aug. 10, 1943 |
| 2,309,941 | Jones | Dec. 11, 1945 |
| 2,396,513 | Jones | Mar. 12, 1946 |
| 2,447,475 | Kaberg | Aug. 17, 1948 |
| 2,450,543 | Flenner | Oct. 5, 1948 |
| 2,453,983 | Sexton et al. | Nov. 16, 1948 |

OTHER REFERENCES

Science, Feb. 20, 1948, pages 196 and 197.
Botanical Gazette, March 1947, pages 301 to 303, 344 to 349.
Science News Letter, Aug. 2, 1947, page 69.